(12) United States Patent
Edwards et al.

(10) Patent No.: US 12,443,587 B2
(45) Date of Patent: Oct. 14, 2025

(54) ANY-LOCAL-QUORUM CONSISTENCY FOR DISTRIBUTED DATABASES REPLICATED ACROSS MULTIPLE SITES

(71) Applicant: NetApp, Inc., San Jose, CA (US)

(72) Inventors: Blake Edwards, San Jose, CA (US); William Zhang, San Jose, CA (US); Lawrence Yu, San Jose, CA (US); David Ou, San Jose, CA (US); Song Guen Yoon, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/488,795

(22) Filed: Oct. 17, 2023

(65) Prior Publication Data

US 2025/0124016 A1    Apr. 17, 2025

(51) Int. Cl.
  *G06F 16/00*    (2019.01)
  *G06F 16/23*    (2019.01)
  *G06F 16/27*    (2019.01)

(52) U.S. Cl.
  CPC .......... *G06F 16/2365* (2019.01); *G06F 16/27* (2019.01)

(58) Field of Classification Search
  CPC .............................. G06F 16/2365; G06F 16/27
  See application file for complete search history.

(56) References Cited

U.S. PATENT DOCUMENTS

| | | | |
|---|---|---|---|
| 6,449,734 B1 | 9/2002 | Shrivastava et al. | |
| 7,765,187 B2 | 7/2010 | Bergant et al. | |
| 7,925,624 B2 | 4/2011 | Vosshall et al. | |
| 8,396,840 B1 | 3/2013 | Mchugh et al. | |
| 8,843,441 B1 | 9/2014 | Rath et al. | |
| 8,930,312 B1 | 1/2015 | Rath et al. | |
| 9,053,167 B1 | 6/2015 | Swift et al. | |
| 9,069,827 B1 | 6/2015 | Rath et al. | |
| 9,280,591 B1 | 3/2016 | Kharatishvili et al. | |
| 9,489,434 B1 | 11/2016 | Rath | |
| 9,507,843 B1 | 11/2016 | Madhavarapu et al. | |
| 9,576,038 B1 | 2/2017 | Huang et al. | |
| 9,699,017 B1 | 7/2017 | Gupta et al. | |

(Continued)

OTHER PUBLICATIONS

Abawajy et al., "Data Replication Approach with Consistency Guarantee for Data Grid", IEEE, vol. 63, No. 12, pp. 2975-2987 (Year: 2014).*

(Continued)

*Primary Examiner* — Alexander Khong

(57) ABSTRACT

A storage application is disclosed herein that employs a method for managing read and write requests associated with a database distributed across multiple replicas in multiple data centers. The storage application may be implemented on one or more computing devices in the context of a data center, cloud environment, or the like. The method includes the storage application receiving a client request to perform an operation with respect to an object at an any-local-quorum consistency level. In response to client request, the storage application iteratively generates and submits coordinator requests to the multiple data centers at a local-quorum consistency level, until one of the multiple data centers successfully replies to one of the coordinator requests with a result. The storage application then replies to the client request based on the result provided by the one of the multiple data centers.

20 Claims, 9 Drawing Sheets

(56) References Cited

U.S. PATENT DOCUMENTS

| | | |
|---|---|---|
| 10,037,346 B1 | 7/2018 | Hsieh et al. |
| 10,191,663 B1 | 1/2019 | O'neill et al. |
| 10,621,049 B1 | 4/2020 | Certain et al. |
| 10,776,384 B1 | 9/2020 | Jackson et al. |
| 11,036,677 B1 | 6/2021 | Grunwald et al. |
| 11,100,129 B1 | 8/2021 | Popick et al. |
| 11,341,163 B1 | 5/2022 | Sridharan et al. |
| 11,360,689 B1 | 6/2022 | Grunwald et al. |
| 11,386,072 B1 | 7/2022 | Narayan et al. |
| 11,561,864 B1 | 1/2023 | Brahmadesam et al. |
| 11,741,078 B1 | 8/2023 | Narendra et al. |
| 11,809,404 B1 | 11/2023 | Mritunjai et al. |
| 11,914,571 B1 | 2/2024 | Bao et al. |
| 11,921,699 B1 | 3/2024 | Govindagowda et al. |
| 11,940,994 B2 | 3/2024 | Zhang et al. |
| 12,032,562 B1 | 7/2024 | Zuber et al. |
| 12,056,025 B2 | 8/2024 | Karr et al. |
| 2007/0214314 A1 | 9/2007 | Reuter |
| 2007/0282915 A1 | 12/2007 | Vosshall et al. |
| 2008/0028006 A1 | 1/2008 | Liu et al. |
| 2008/0183973 A1* | 7/2008 | Aguilera ............ G06F 11/2094 711/E12.066 |
| 2009/0070337 A1 | 3/2009 | Romem et al. |
| 2010/0106813 A1 | 4/2010 | Voutilainen et al. |
| 2011/0184920 A1 | 7/2011 | Vosshall et al. |
| 2011/0289052 A1* | 11/2011 | Rambacher ......... G06F 16/2322 707/624 |
| 2012/0166390 A1 | 6/2012 | Merriman et al. |
| 2012/0259894 A1 | 10/2012 | Varley et al. |
| 2014/0095813 A1* | 4/2014 | Shukla ................. G06F 3/0611 711/E12.001 |
| 2015/0278244 A1 | 10/2015 | Shvachko et al. |
| 2016/0179923 A1 | 6/2016 | Chehreghani |
| 2016/0182633 A1 | 6/2016 | Grebnov et al. |
| 2017/0054802 A1 | 2/2017 | Annamalai et al. |
| 2017/0075946 A1 | 3/2017 | Bossa et al. |
| 2018/0075122 A1 | 3/2018 | Banister et al. |
| 2019/0196918 A1 | 6/2019 | Bulkowski et al. |
| 2020/0068010 A1 | 2/2020 | Xing et al. |
| 2020/0097354 A1 | 3/2020 | Barnett |
| 2020/0374315 A1 | 11/2020 | Milton et al. |
| 2021/0117406 A1 | 4/2021 | Burkule et al. |
| 2021/0117443 A1* | 4/2021 | Zheng ................... G06F 16/273 |
| 2021/0141770 A1 | 5/2021 | Wang et al. |
| 2021/0303164 A1 | 9/2021 | Grunwald et al. |
| 2021/0397599 A1 | 12/2021 | Watson et al. |
| 2022/0004542 A1 | 1/2022 | Han et al. |
| 2022/0103622 A1 | 3/2022 | Camargos et al. |
| 2022/0138223 A1 | 5/2022 | Sonner et al. |
| 2023/0121272 A1 | 4/2023 | Subramanian et al. |
| 2023/0135583 A1 | 5/2023 | Jernigan, IV |
| 2023/0169093 A1 | 6/2023 | Whitaker et al. |
| 2023/0177206 A1 | 6/2023 | Rolle et al. |
| 2023/0308507 A1 | 9/2023 | Camargos et al. |
| 2023/0325378 A1 | 10/2023 | Jain et al. |
| 2023/0342340 A1 | 10/2023 | Maharaja |
| 2023/0393927 A1 | 12/2023 | Karr et al. |
| 2023/0394065 A1 | 12/2023 | Karr et al. |
| 2024/0004860 A1 | 1/2024 | Soundararajan et al. |
| 2024/0004897 A1 | 1/2024 | Pandis et al. |
| 2024/0220471 A1 | 7/2024 | Yang |

OTHER PUBLICATIONS

Gao et al., "Dual-Quorum: A Highly Available and Consistent Replication System for Edge Services", IEEE, vol. 7, No. 2, pp. 159-174 (Year: 2010).*

* cited by examiner

ANY-LOCAL-QUORUM CONSISTENCY FOR DISTRIBUTED DATABASES REPLICATED ACROSS MULTIPLE SITES

TECHNICAL FIELD

Aspects of the disclosure are related to the field of data storage and in particular to software-defined object storage and replication technology.

BACKGROUND

Organizations employ distributed databases to provide redundancy and decrease data access times for objects stored in the databases. A distributed database is one where data is stored on multiple nodes in a data center and across multiple sites. Each node may be deployed as a container on physical or virtual servers in a data center that communicates with a control node at its site which may differ on a per-query/request basis. While the database runs on multiple nodes, it appears to client applications as a single instance. In addition, data is replicated across nodes and sites to ensure availability and fault tolerance.

The number of times a record is replicated within a given datacenter is reflected by a replication factor (RF). For example, a datacenter having an RF of two means that each object in a database is replicated twice in the datacenter, while an RF of three would mean that each object is replicated three times, although there may be more than the RF-number of replica nodes employed in a data center (e.g., five). For example, an object in a database having an RF of two in a datacenter employing five nodes would be replicated to two of the five nodes.

A consistency level refers to how many replica nodes must successfully implement a read or write operation for the operation to be considered complete. For instance, with respect to a write operation, a consistency level of two requires two replica nodes to successfully write an object for the write operation to be considered successful (while the object is ultimately written to all three). With respect to read operations, the consistency level refers to how many replica nodes must respond to a query before the query is considered to have failed, where failure means that no determination was made whether an object was present in the database.

Generally speaking, it is often desirable for newly written data to be available for read operations almost immediately. To achieve what is termed "read-after-new-write" consistency, which is a less strict version of "read-after-write" consistency, a new object may be written at a relatively low consistency level but read at a very high consistency level. This allows the write operation to be completed with speed while also guaranteeing that the data will be found in response to immediate read requests. For instance, a write operation at a consistency level of two will write an object to at least two nodes in a distributed database, while a read for the same object at an all-consistency level will search all the nodes for the same object. In this manner, the write operation's low consistency requirement allows for expedient success but is less protected from fault issues due to the small number of replications. Alternatively, a read operation subject to an all-consistency level guarantees that the object will be found but is very time consuming and resource intensive because all nodes are checked.

One technique to mitigate such problems is to begin the read operation at a lower consistency level and progressively escalate the consistency level until the data is found. For instance, the read operation may begin with one replica, then two, and so on through a quorum level up to an all-replica consistency level. Such an approach is faster but presents a problem if even one of the replicas is unavailable. This is because, if even a single replica is down when the consistency level mandates that all replicas respond, the query fails as unavailable (as opposed to being able to respond with certainty in the negative that the object has not been found).

It may be appreciated that the quorum level search discussed above applies to all replicas across all sites. That is, a query implemented on a quorum basis requires that a quorum of all replicas across all sites respond. However, this represents a mismatch with low consistency levels on write operations since the nodes that wrote the data might be unavailable at the time of the read request. For example, assume a write operation with a consistency level of two that stores an object in a minimum of two of nine nodes distributed across three data centers. While the write would be considered complete after just two nodes respond, an immediate read request at a quorum consistency level would not be guaranteed to find the object. This is because the quorum level would require five of the nine nodes to respond, which might not overlap with the two nodes that responded to the write request. Of course, it is possible that five or more of the nodes did complete the write, but this fact is not guaranteed. Alternatively, the read request could be submitted at the all-consistency level, thereby causing all nine of the nodes to be queried, but such an approach would be very time consuming at-scale.

The read request could also be submitted at the each-quorum consistency level, mandating that responses be fielded from a quorum of nodes at each data center across which the nine replicas are distributed. Assuming an even distribution of the nine nodes across three data centers, the each-quorum consistency level would still not guarantee that the object is found because of the relatively low level of consistency applied by the write operation. For example, the two successful nodes that completed the write operation might each reside in different data centers. Thus, it is possible that each quorum of nodes in each of the two data centers excludes the one node that responded to the write request if that node happens to be unavailable.

On the flip side, a higher level of consistency could be employed with respect to write operations to increase the likelihood that data can be found on reads. For example, a write operation executed at an each-quorum consistency level would mandate that a quorum of nodes at each data center respond for a write to be considered complete. Pairing a write at an each-quorum consistency level with a read at an all-consistency level would guarantee that a recently written object would be found, although it could be very time-consuming to find it. Pairing a write operation executed at an each-quorum consistency level with a read at an each-quorum consistency level (instead of all) would be faster and would also guarantee that a recently written object would be found, although it too would be overly time consuming and resource intensive.

More generally, different combinations of write and read consistencies produce a range of overall consistencies from weak to strong. For example, assume again that nine replicas are distributed evenly across three data centers. A write at a consistency level of two paired with a read at a consistency level of two would far from guarantee that the data is found, since it is unlikely that the same two nodes that wrote the data will overlap with the two nodes that respond to a read query. While better, a write consistency level of two paired with a quorum consistency level on read will also not guarantee that an object will be found since the quorum of five replicas need not overlap with the two nodes that successfully stored the object. In contrast, a quorum-level write paired with a quorum-level read is guaranteed to find the object, since at least one of the five of nine nodes that responded to the write request will overlap with one of the five nodes that responded to the read request. Unfortunately, such a pairing may be excessively time-consuming and therefore undesirable with respect to the performance expected of read-after-new-write features.

SUMMARY

Technology disclosed herein includes support for an any-local-quorum consistency level with respect to operations performed against distributed databases. In one aspect, pairing the any-local-quorum consistency level for read requests with writes performed at an each-quorum consistency level guarantees that recently written data will be found. Such a pairing may be beneficial with respect to important data that is written infrequently, but that is read frequently. In addition, such a pairing may generally meet the performance expected of read-after-new-write features. In another aspect, pairing the any-local-quorum consistency level for write requests with reads performed at an each-quorum consistency level allows writes to be processed faster, while still guaranteeing that the data will be found when the subject of read requests.

In one implementation, a method of operating a storage application implemented on one or more computing devices is disclosed. The storage application receives a client request to perform an operation with respect to an object at an any-local-quorum consistency level. In response to the client request, the storage application iteratively generates and submits coordinator requests to the multiple data centers at a local-quorum consistency level, until one of the multiple data centers successfully replies to one of the coordinator requests with a result. The storage application replies to the client request based on the result provided by the one of the multiple data centers.

In some implementations, the storage application receives a different client request to perform a different operation with respect to the object at an each-quorum consistency level. In response to the different client request, the storage application also generates and submits one or more different coordinator requests to one or more of the multiple data centers at a local-quorum consistency level. The storage application may reply to the different client request based on one or more results provided by the one or more of the multiple data centers.

This Summary introduces a selection of concepts in a simplified form that are further described below in the Technical Disclosure. It may be understood that this Summary is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

DETAILED DESCRIPTION

Figure 1:
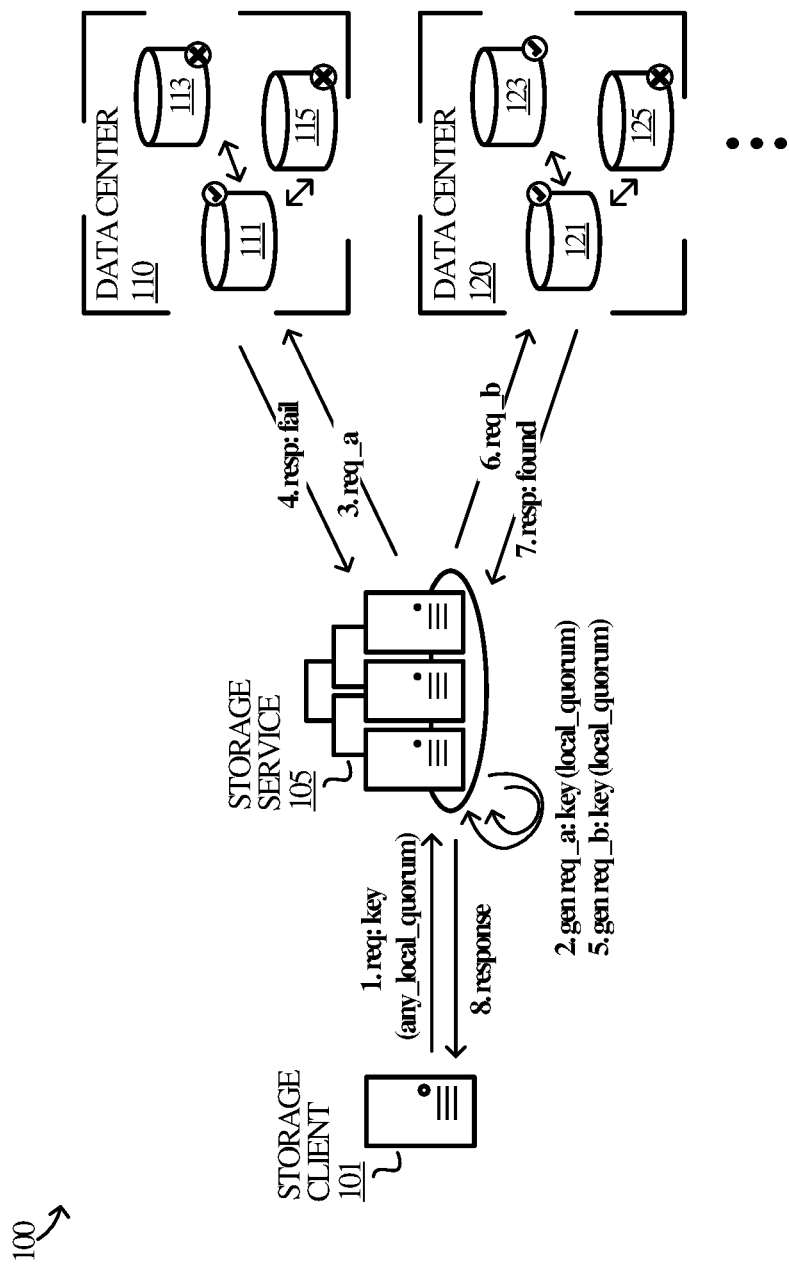
FIG. 1 illustrates a storage environment in an implementation.

An any-local-quorum consistency level is disclosed herein that allows distributed databases to be read from and written to in a faster and more efficient manner than before. In contrast with an each-quorum consistency level, which requires a quorum of replica nodes at each data center in a multi-site environment, the any-local-quorum consistency level allows a system to proceed upon just one data center responding to a request based on its local quorum. Thus, the any-local quorum consistency level saves time and resources relative to the each-quorum consistency level by avoiding inter-data center communications.

However, when paired with an each-quorum consistency level on an opposing operation, the any-local-quorum consistency level guarantees that data will be found. For example, pairing an each-quorum consistency level on writes with an any-local-quorum consistency level on reads ensures a) that an object is successfully written to a quorum of replica nodes in each data center in a multi-site environment and b) that the object will be found in one of the data centers. Conversely, pairing the any-local-quorum consistency level on writes with the each-quorum consistency level on reads ensures a) an object will be written to at least one quorum of replica nodes in one of the data centers (if not others) and b) that the object will be found in the one data center (if not others).

More generally, a storage application is disclosed herein that employs a method for managing read and write requests associated with a database distributed across multiple replicas in multiple data centers. The storage application may be implemented on one or more computing devices in the context of a data center, cloud environment, or the like. The method includes the storage application receiving a client request to perform an operation with respect to an object at an any-local-quorum consistency level. In response to the client request, the storage application iteratively generates and submits coordinator requests to the multiple data centers at a local-quorum consistency level, until one of the multiple data centers successfully replies to one of the coordinator requests with a result. The storage application then replies to the client request based on the result provided by the one of the multiple data centers.

In some implementations, the method includes the storage application receiving a different client request to perform a different operation with respect to the object at an each-quorum consistency level and, in response to the different client request, generating and submitting one or more different coordinator requests to one or more of the multiple data centers at a local-quorum consistency level. The storage application may reply to the different client request based on one or more results provided by the one or more of the multiple data centers.

In various examples, the operation may be a read operation or a write operation. In cases where the operation is a read operation, the different operation is a write operation, and vice-versa. When the operation is a read operation, the write operation is performed at the each-quorum consistency level prior to receiving the client request to perform the read operation at the any-local-quorum consistency level. When the operation is a write operation, the different operation—which is a read operation—is performed at the each-quorum consistency level subsequent to the write operation being performed by the one of the multiple data centers at the any-local-quorum consistency level.

In some implementations, iteratively generating and submitting the coordinator requests to the multiple data centers at the local-quorum consistency level comprises generating and submitting a coordinator request to one data center at a time. In addition, generating and submitting the coordinator request to one data center at a time may begin with a first one of the data centers, and only moves to a next one of the data centers upon receiving a reply from a previous one of the data centers that necessitates moving to the next one of the data centers. The coordinator requests may be submitted to a coordinator node in each data center of the multiple data centers, where the coordinator node only replies to the coordinator request once a quorum of nodes in the data center have responded.

Various embodiments of the present technology provide for a wide range of technical effects, advantages, and/or improvements to computing systems and components. For example, various embodiments may include one or more of the following technical effects, advantages, and/or improvements: 1) non-routine and unconventional dynamic implementation of an any-local-quorum consistency level that allows distributed databases to be read from and written to in a faster and more efficient manner than before; 2) non-routine and unconventional operations for relaxing strict quorum requirements; 3) dynamic modification of an any-local-quorum query into one or more local-quorum queries directed to different data centers, 4) non-routine and unconventional use of an any-local-quorum queries where the any-local-quorum consistency level is not supported by the target database environments and/or 5) distributed storage systems with unconventional components configured to implement queries with any-local quorum consistency levels.

Referring now to the drawings, FIG. 1 illustrates a storage environment 100 in which the concepts disclosed herein may be employed. Storage environment 100 includes a storage client 101, a storage service 105, and multiple data centers represented by data center 110 and data center 120. Storage client 101 is operatively coupled with storage service 105, while storage service 105 is operatively coupled with nodes in data centers 110 and 120. It may be appreciated that only two data centers are illustrated for exemplary purposes, although more than two data centers may be contemplated. (Operational steps 1-8 illustrated in FIG. 1 are addressed below in a brief scenario.)

Storage client 101 communicates with storage service 105 to obtain access to a distributed database that is replicated across multiple data center sites, and across multiple nodes within each data center. Here, storage service 105 provides a distributed database with a replication factor (RF) of three to storage clients such as storage client 101. Thus, each object that is written to the distributed database is replicated to three nodes within each data center. For example, data center 110 includes nodes 111, 113, and 115, while data center 120 includes 121, 123, and 125. A quantity of nodes greater than the replication factor may be present in each data center, although only three nodes are illustrated herein for the sake of brevity. For example, data center 110 could include five, seven, or nine or more nodes, even with an RF of just three.

Figure 6:
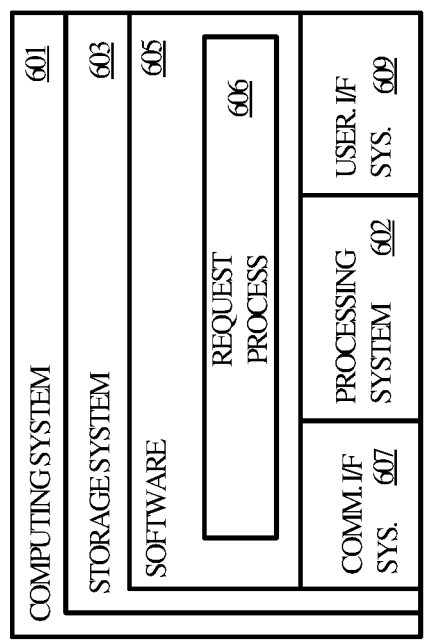
FIG. 6 illustrates a computing system in an implementation.

Storage client 101 is representative of any software application or component capable of interacting with a cloud storage service, whether the cloud is a private, public, or hybrid cloud. Storage client 101 communicates with a cloud storage service to obtain information about storage resources, to create, update, and delete objects, and the like. Storage client 101 may be implemented in the context of a physical or virtual computing system, of which computing system 601 in FIG. 6 is representative.

Storage service 105 is representative of any storage service capable of providing storage resources to clients in the context of private, public, hybrid-cloud, and multi-cloud storage environments. Examples of storage service 105 include the NetApp® StorageGRID offering, which is a software-defined object storage suite that supports a wide range of use cases across public, private, and hybrid multi-cloud environments.

Storage clients may interface with storage service 105 to, for example, store and access large volumes of unstructured data for analytics and data lake applications, to secure backup and archiving using object storage, and to manage growing media data, such as video, audio, and images. Storage service 105 may communicate with storage client 101 in accordance with any application programming interface (API) such as the Amazon® S3 API or the OpenStack Swift API. Features and capabilities provided by storage service 105 include automated lifecycle management to store, secure, protect, and preserve unstructured data cost effectively over long periods. Storage service 105 also provides secure, durable storage for unstructured data at scale, including by offering data replication across multiple sites. Storage service 105 may be implemented on one or more physical or virtual computing devices, and in the context of a data center, of which computing system 601 in FIG. 6 is representative.

Data center 110 is representative of a physical or logical site that provides multiple nodes across which multiple replicas of a distributed database are maintained. Similarly, data center 120 is representative of a physical or logical site that provides multiple nodes across which multiple replicas of a distributed database are maintained. The nodes may be implemented as containers on physical or virtual computing resources, of which computing system 601 in FIG. 6 is representative. While illustrated as separate from storage service 105, storage service 105 may be co-located at one of the data centers, distributed across the data centers, or implemented in an entirely separate data center.

Figure 2:
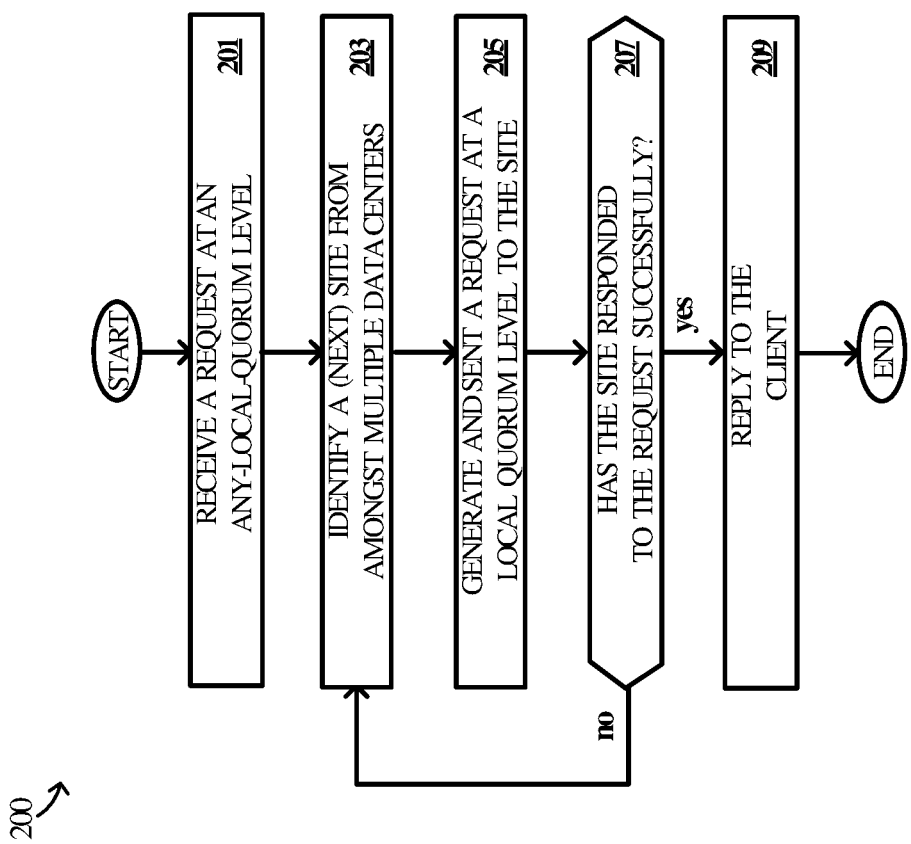
FIG. 2 illustrates a request process in an implementation.

FIG. 2 illustrates a request process 200 employed by a computing device in the context of storage service 105 when handling requests submitted by storage clients. Request process 200 may be implemented in program instructions (software and/or firmware) by one or more processors of the computing device. The program instructions direct the computing device to operate as follows, referring parenthetically to the steps in FIG. 2.

To begin, the computing device receives a client request to perform an operation with respect to an object (step 201). Example operations include—but are not limited to—reads, writes, and deletes. The any-local-quorum consistency level is assumed here for exemplary purposes. In some cases, the any-local-quorum consistency level is not indicated per se in the client request itself but may instead be the default level for all requests. In other cases, the any-local-quorum consistency level may be identified in the request. In still other cases, the computing device may determine the consistency level on a per-request basis.

In response to the client request, the computing device identifies a site associated with the object from among multiple data center sites that store replicas of the object (step 203). The computing device may, for example, begin with the site that received the client request. The computing device may also select the site based on load-balancing criteria, pseudo randomly, or on some other basis. In some cases, such as a new write, the object does not yet exist in the database and as such, the computing device would select the site irrespective of the object's location. Similarly, the computing device may select the site to which the object should be written based on load-balancing criteria, pseudo randomly, or on some other basis.

Next, the computing device generates and submits a request at a local-quorum consistency level to the identified site (step 205). The request is sent to a coordinator node at the site that manages interactions with other nodes at the site that have copies of the object. The coordinator node may change on a per-request basis. That is, multiple nodes at a data center may be capable of serving as the coordinator node with respect to a given client request. Which node serves as the coordinator node may be determined on a round-robin basis, pseudo randomly, or on some other bases such as bandwidth, availability, and the like. In some cases, the coordinator node may itself retain a copy of the object, although in other cases, the coordinator need not be one of the replica nodes associated with the target object.

The coordinator node, per the local-quorum consistency level specified by the request, attempts to obtain responses from a quorum of the replica nodes that hold the target object. A local quorum requires a majority of the replica nodes at a given site to reply with valid responses. For example, a database having a replication factor of three would be replicated to three nodes. As such, responses from two of the three nodes would represent a local quorum. In another example, a database replicated to five nodes would require three of the nodes to respond for the local quorum constraint to be satisfied.

It may be appreciated that more nodes may exist in a given data center than the replication factor. For example, a data center may house nine nodes across which a database is distributed with a replication factor of three. The replication factor of three causes each object in the database to be replicated on three of the nine nodes. However, which specific nodes are used to replicate each object may vary. For instance, while one object may be replicated to one subset of three nodes chosen from the nine nodes, a different object may be replicated to a different subset of three nodes chosen from the nine nodes. The subsets may also overlap with each other. For instance, one object may be replicated to one subset that overlaps at least partially with a subset of nodes that store a different object.

A response from one of the replica nodes either confirms the existence of the object or confirms the absence of the object. If the coordinator node is able to obtain responses from a quorum (potentially including from itself), it can reply in either the affirmative or the negative—but in either case, the reply would be a valid response. Conversely, if the coordinator node is unable to obtain responses from a quorum of nodes, then it cannot reply to the request and the request times out, an error message is returned, or some other indication is provided, all of which are considered invalid responses by the requesting computing device.

The computing device that employs quorum process 200 monitors for the coordinator node at the data center to respond to its local-quorum request to determine whether the coordinator node has responded successfully (step 207). If the coordinator node has replied with a valid response, then the computing device may reply to the requesting client accordingly. For instance, if the initial request from the client was a write request, then the computing device would respond that the write was completed. If the initial request was a read request, then the computing device would respond that the object exists and is available to be read.

However, if the coordinator node has not responded within an allowed time, or otherwise replies with an invalid response, the computing device returns to step 203 and selects the next site. Reasons for an invalid response include the inability of the coordinator node to obtain responses from a local quorum of nodes. The lack of a local quorum may be caused by an unavailability event that brings down one or more of the replica nodes such as scheduled maintenance or upgrades, unscheduled events, and the like.

Referring back to FIG. 1, a brief scenario illustrates an application of request process 200 with respect to the elements of storage environment 100. In operation, storage client 101 submits a request to storage service 105. The request may identify a key associated with a target object (but not always), as well as the any-local-quorum consistency level. Storage service 105 responsively generates a new request with a local-quorum consistency level and sends the request to a coordinator node at data center 110.

Within data center 110, the coordinator node is unable to achieve a quorum of responses from the three replica nodes associated with the target object, which are assumed here to be nodes 111, 113, and 115. This is because, while node 111 is available, neither node 113 nor node 115 are available. Thus, a local quorum cannot be achieved, resulting in an invalid response to the request.

Storage service 105 responds to the invalid response by generating another new request—again at the local-quorum consistency level—and submits the new request to a coordinator node at data center 120. This time, the coordinator node successfully achieves a local quorum as both itself and node 123 are available from among the replica nodes associated with the target object (assumed to be nodes 121, 123, and 125). That is, the unavailability of just node 125 does not prevent the coordinator node from responding validly to the request.

Storage service 105 receives the valid response from the coordinator node in data center 120 and responds accordingly to storage client 101. For example, storage service 105 may reply in the case of a write request that the object was successfully written to the database. In the case of a read request, storage service 105 may reply that the object was found, or that the object was not found, both of which are valid responses. Storage client 101 may then proceed according to its own logic as to the next steps regarding the object.

Figure 3A:
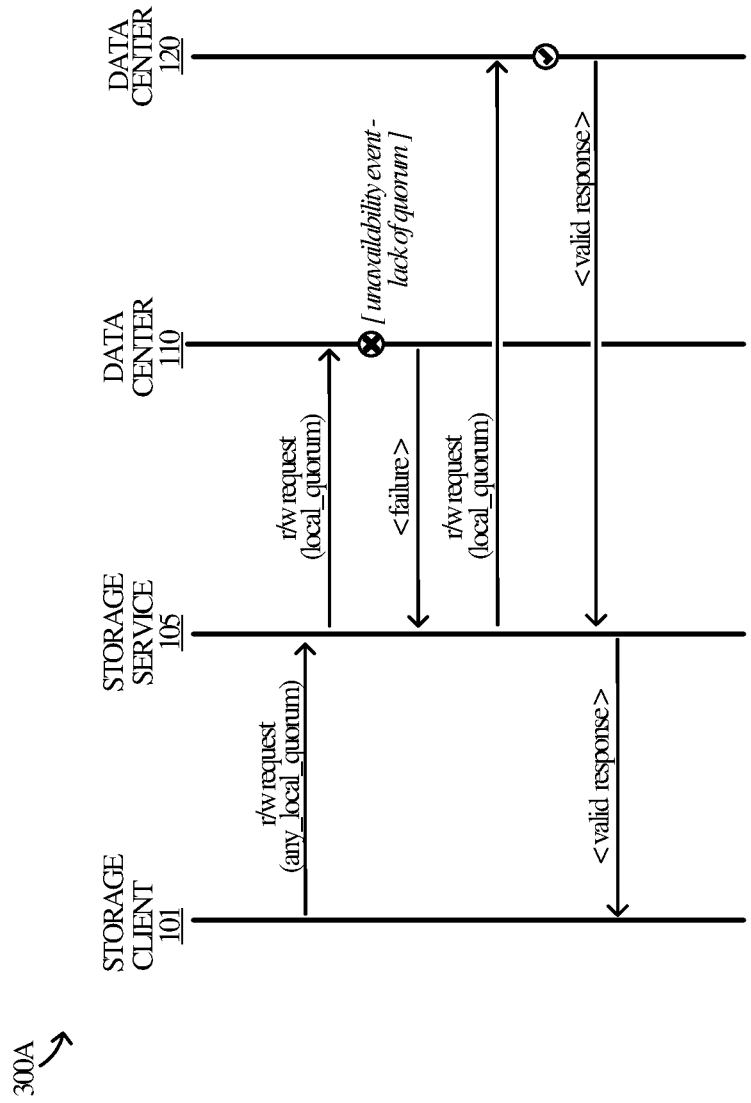
FIGS. 3A-3C each illustrate a different operational sequence in various implementations.

FIG. 3A illustrates a variation of the same operational scenario, although in the context of a sequence diagram 300A to highlight the relative timing of events. As illustrated, storage service 105 receives a request from storage client 101 that indicates an any-local-quorum consistency level. Storage service 105 interacts with data center 110 to fulfill the request on a local-quorum consistency basis, but the attempt fails due to the inability of the coordinator node to achieve a quorum. Accordingly, storage service 105 turns to data center 120 to fulfill the request on a local-quorum basis, which it does successfully.

Figure 3B:
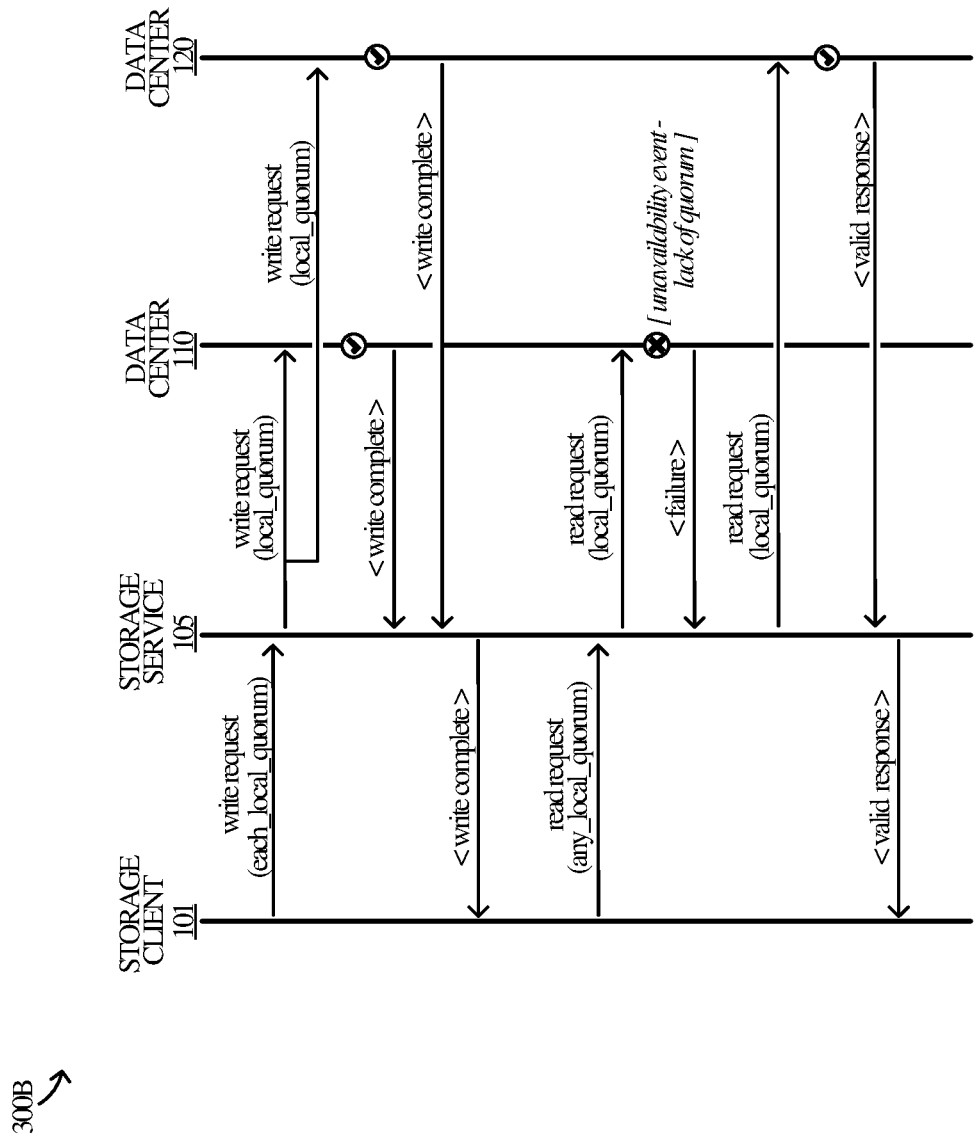

FIG. 3B illustrates a more specific variation where the request with an any-quorum consistency level is a read request. In sequence diagram 300B, storage client 101 submits a write request to storage service 105 to store a new object. The request identifies the new object, as well as an each-quorum consistency level. Storage service 105 responsively communicates with both data center 110 and data center 120 to fulfill the request on a local-quorum basis. (While shown here as occurring in parallel, it may be appreciated that in some implementations, a single coordinator node in one data center may serially control or otherwise manage the implementation of the write request, while in others, the write request may be communicated in parallel from storage service 105 to multiple coordinator nodes, one each data center.) Here, it is assumed for exemplary purposes that both data centers are available to fulfill the request on that basis, meaning that a quorum of replica nodes in each data center successfully completed the write. Storage service 105 receives an indication of the write operations and replies to storage client 101 with a key that may be used for later operations.

Soon after the write has been completed, storage client 101 submits a read request to storage service 105 for the same object. The read request is an example of a read-after-new-write operation that allows objects to be read out as soon as possible. The request identifies the key associated with the object, as well as the any-local-quorum consistency level. Storage service 105 responsively generates a new request with a local-quorum consistency level and sends the request to a coordinator node at data center 110.

Within data center 110, the coordinator node is unable to achieve a quorum of responses from the three replica nodes associated with the target object, which are assumed here to be nodes 111, 113, and 115. This is because, while node 111 is available, neither node 113 nor node 115 are available. Thus, a local quorum cannot be achieved, resulting in an invalid response to the request. Storage service 105 responds to the invalid response by generating another new request—again at the local-quorum consistency level—and submits the new request to a coordinator node at data center 120.

This time, the coordinator node in data center 120 successfully achieves a local quorum as both itself and node 123 are available from among the replica nodes associated with the target object (assumed to be nodes 121, 123, and 125). That is, the unavailability of just node 125 does not prevent the coordinator node from responding validly to the request. Storage service 105 receives the valid response from the coordinator node in data center 120 and responds accordingly to storage client 101. For example, storage service 105 may reply that the object was found, thereby allowing storage client 101 to retrieve the object.

Figure 3C:
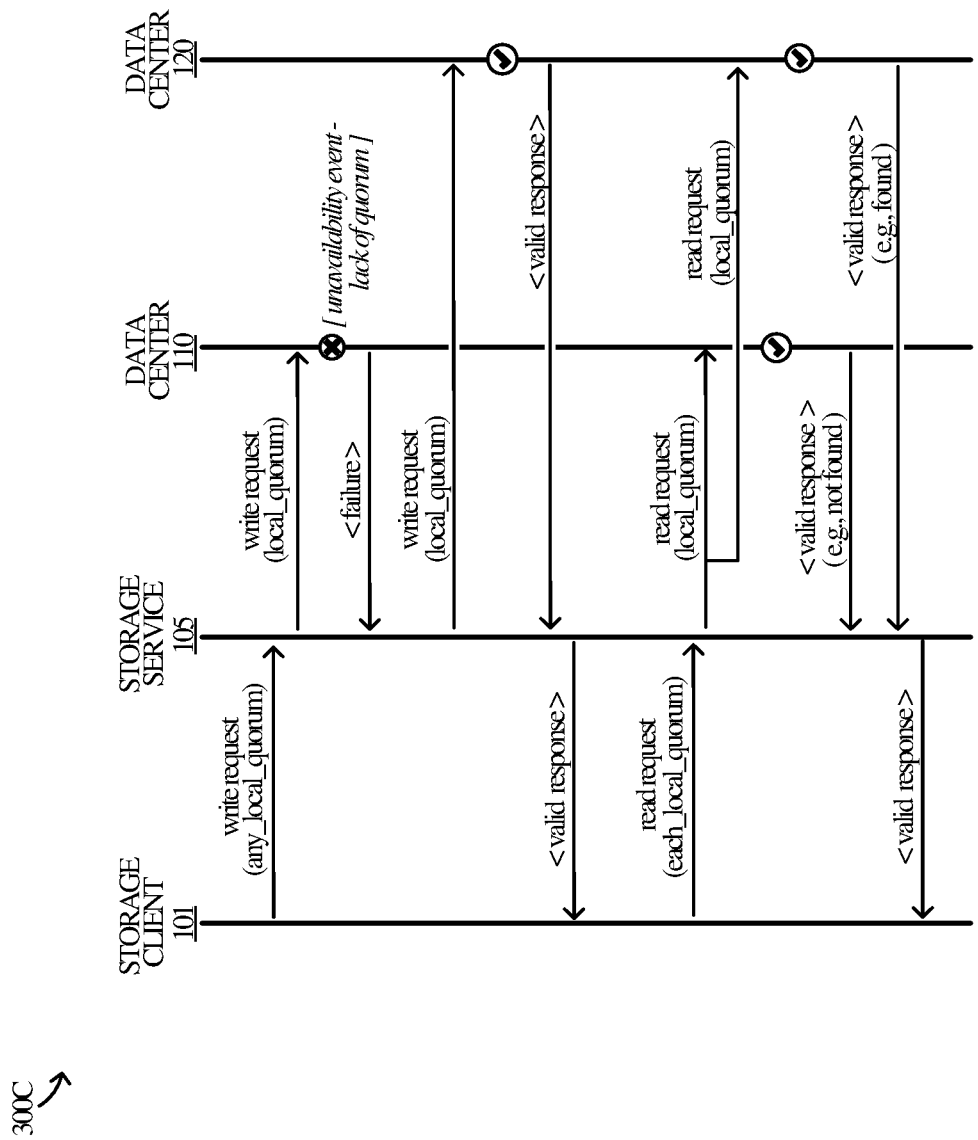

FIG. 3C illustrates another specific variation where the request with an any-quorum consistency level is a write request. In sequence diagram 300C, storage client 101 submits a write request to storage service 105 to store a target object in accordance with the any-local-quorum consistency level. Storage service 105 responsively generates a new write request with a local-quorum consistency level and sends the write request to a coordinator node at data center 110.

Within data center 110, the coordinator node is unable to achieve a quorum of responses from three replica nodes tasked with storing the object, which are assumed here to be nodes 111, 113, and 115. This is because, while node 111 is available, neither node 113 nor node 115 are available. Thus, a local quorum cannot be achieved, resulting in an invalid response to the write request.

Storage service 105 responds to the invalid response by generating another new write request—again at the local-quorum consistency level—and submits the new write request to a coordinator node at data center 120. This time, the coordinator node successfully achieves a local quorum as both itself and node 123 are available from among the replica nodes associated with the target object (assumed to be nodes 121, 123, and 125).

Storage service 105 receives the valid response from the coordinator node in data center 120 and responds accordingly to storage client 101 that the object was written successfully. Soon thereafter, storage client 101 submits a read request to storage service 105 to access the recently-stored object. The request identifies a key associated with the new object, as well as an each-quorum consistency level. Storage service 105 responsively communicates with both data center 110 and data center 120 to fulfill the request on a local-quorum basis. (While shown here as occurring in parallel, it may be appreciated that in some implementations, a single coordinator node in one data center may control or otherwise manage the implementation of the write request, while in others, the write request may be communicated in parallel from storage service 105 to multiple coordinator nodes, one in each data center.)

Here, it is assumed for exemplary purposes that both data centers are available to fulfill the request on that basis, in that their respective coordinator nodes are able to achieve a local quorum. However, the results obtained by each coordinator node in the respective data centers differ relative to each other. With respect to data center 110, the coordinator node achieves a quorum of responses, but the consensus is that the object cannot be found. This may be because the object has not yet been written successfully to the quorum of replica nodes-potentially because of the earlier unavailability that prevented a local quorum.

With respect to data center 120, the coordinator node achieves a quorum of responses that confirm the existence of the object in the replicas. Accordingly, the coordinator node replies to storage service 105 with a valid response indicating its existence, thereby allowing storage client 101 to proceed with its own logic.

Figure 4:
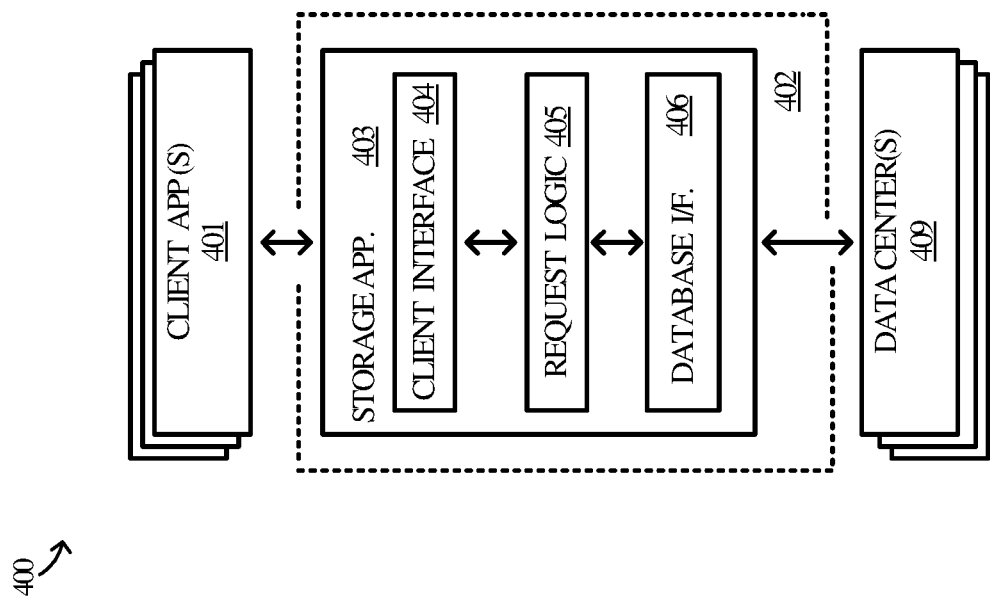
FIG. 4 illustrates a system architecture in an implementation.

FIG. 4 illustrates a system architecture 400 that at a high-level describes various components of a storage service and their interactions with clients and data centers. System architecture 400 includes client applications 401, storage service 402, and data centers 409. Storage service 402 includes request logic 405 and database interface 406.

Client applications 401 are representative of storage clients that interact with storage service 402 to store, read, update, and delete data. Storage service 402 is representative of a cloud storage service with which client applications 401 interface to access data. Data centers 409 are representative of the physical and/or logical sites the store the data.

Storage service 402 includes storage application 403. Storage application 403 is implemented in program instructions in the context of a physical or virtual computing resource, of which computing system 601 in FIG. 6 is representative. Storage application 403 includes a client interface 404 through which it communicates with clients 401. For example, client interface 404 may provide REST endpoint to clients.

Storage application 403 also includes request logic 405. Request logic 405 is representative of a subset of the program instructions specifically configured to handle incoming requests from clients having an any-local-quorum consistency level, whether by default or determined dynamically based on other considerations. In some cases, the incoming requests may lack an express indication of the any-local-quorum consistency level, while in other cases the requests may expressly indicate the any-local-quorum consistency level. The any-local-quorum consistency level may be set as the default consistency level for certain types of operations, while other consistency levels may be set as the default for other types of operations.

Database interface 406 is representative of another subset of program instructions tailored to communicating with coordinator nodes within data centers 409. In an example of the Apache Cassandra distributed database management system, database interface 406 may include various components capable of implementing the Cassandra SDK that provides for interactions with database nodes in data centers 409 in accordance with Cassandra APIs.

Figure 5A:
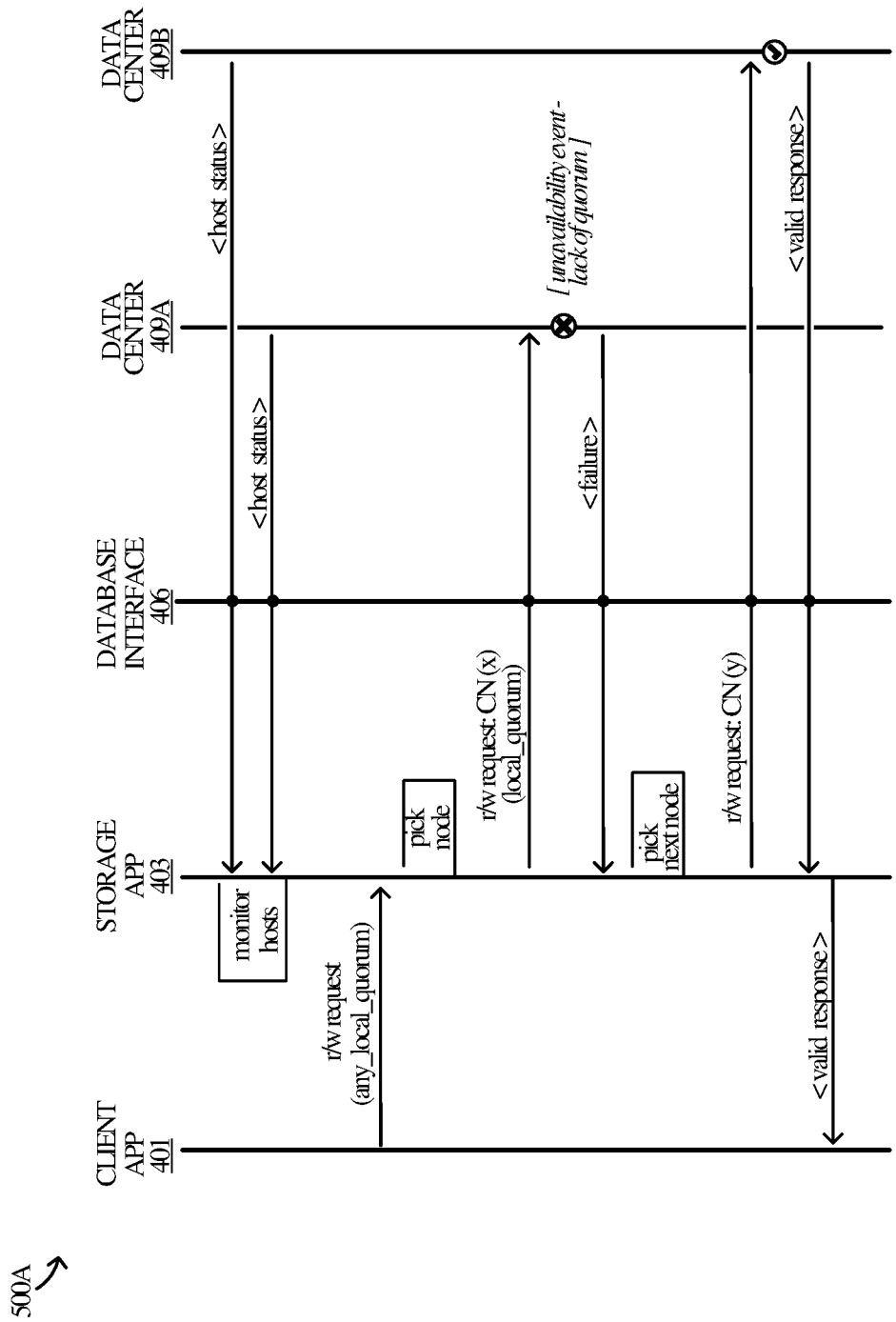
FIG. 5A illustrates an operational sequence in an implementation.

Request logic 405, when employed by a computing device in the context of storage application 403, directs storage application 403 to operate as described with respect to operational sequence 500A in FIG. 5A. In operation, storage application 403 monitors the database topology across sites through a host listener interface provided by database interface 406. The host listener interface notifies storage application 403 when a host of the database goes up or down. Storage application 403 maintains a list of the "up" (available) host nodes at each site that is randomly ordered. When performing queries, the first site attempted is the local site (for which a coordinator node is randomly selected). If the local site fails, storage application 403 randomly selects the next host in the list for a remote site and sets it for the next query.

In this example, storage application 403 receives a client request from one of client applications 401 to perform an operation with respect to an object at an any-local-quorum consistency level. The request may be a write request to store an object, for example, or a read request to access an object. As mentioned, the consistency level may be set to any-local-quorum as the default, or it may be determined dynamically on a per-request basis.

In response to the client request, storage application 403 picks a node at the local site, assumed here to be datacenter 409A. Considering that the object may exist at multiple sites, storage application 403 may also select the site based on load-balancing criteria, pseudo randomly, or on some other basis.

Next, storage application 403 generates and submits a request at a local-quorum consistency level to the identified coordinator node ("x"), doing so by calling into database interface. The request is sent to a coordinator node at the site that manages interactions with other nodes at the site that have copies of the object. Here, the data center site is represented by data center 409A. In some cases, the coordinator node may itself retain a copy of the object, although in other cases, the coordinator need not be one of the replica nodes associated with the target object.

The coordinator node, per the local-quorum consistency level mandated by the request, attempts to obtain responses from a quorum of the replica nodes that hold the target object. As mentioned, a local quorum requires a majority of the replica nodes at a given site to reply with valid responses. For example, a database having a replication factor of three would be replicated to three nodes. As such, responses from two of the three nodes would represent a local quorum. In another example, a database replicated to five nodes would require three of the nodes to respond for the local quorum constraint to be satisfied.

Figure 5B:
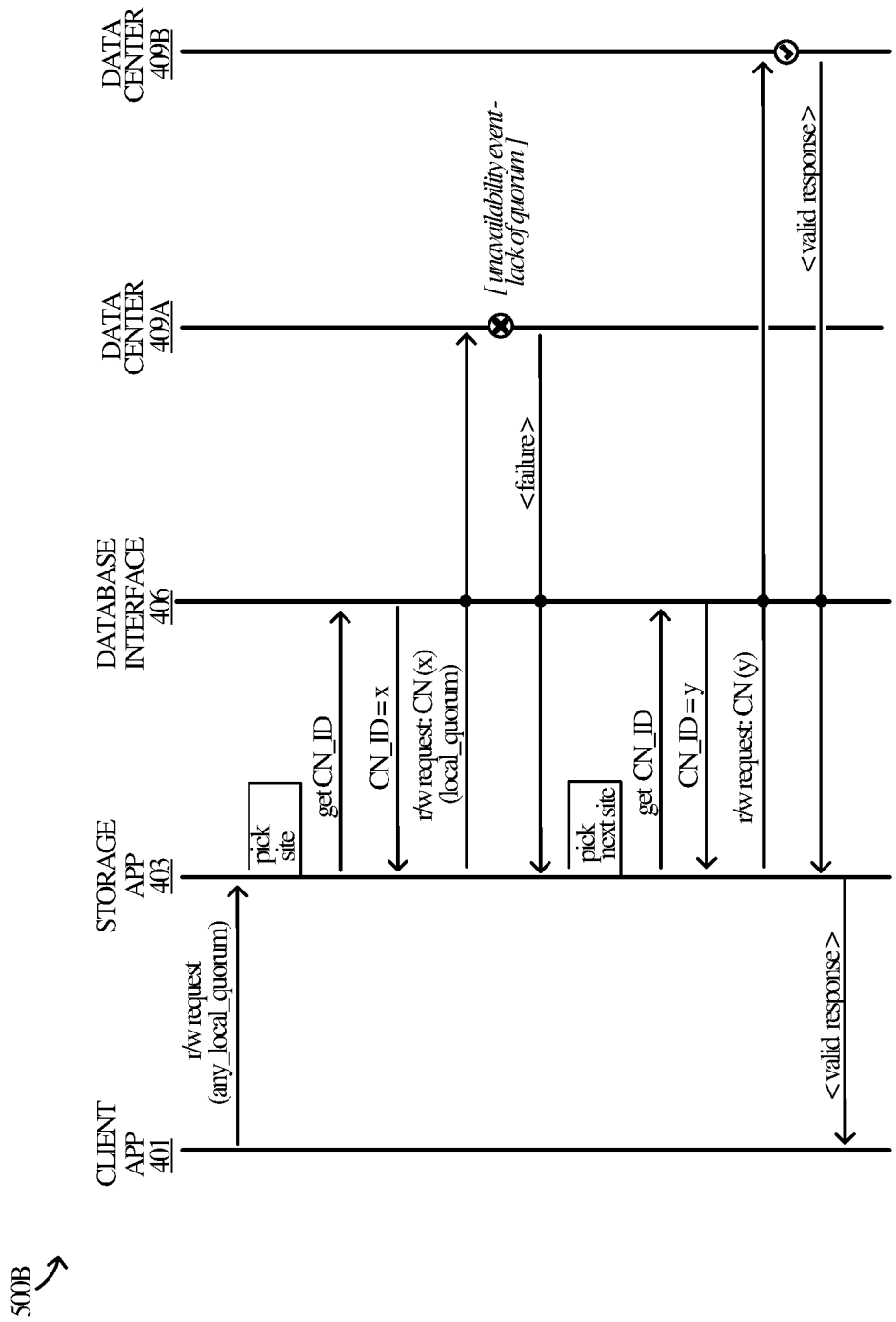
FIG. 5B illustrates an alternative operational sequence in an implementation.

FIG. 5B illustrates an alternative operational scenario 500B in an implementation. In operation, storage application 403 receives a client request from one of client applications 401 to perform an operation with respect to an object at an any-local-quorum consistency level (either by default, indicated expressly, or determined on some other basis). The request may be a write request to store an object, for example, or a read request to access an object.

In response to the client request, storage application 403 identifies a site associated with the object from among multiple data center sites that store replicas of the object. The computing device may, for example, look-up the location of the object based on a key included in the request (if available). Considering that the object may exist at multiple sites, the computing device may also select the site based on load-balancing criteria, pseudo randomly, or on some other basis. If the request is to write a new object, then a key may not be provided, in which case storage application 403 can make the determination with reference to a key.

Having identified a site, storage application 403 calls a component of database interface 406 to determine the identity of a coordinator node at the selected site. The component may access a resource local to storage application 403 such as a list or other such manifest to identify the coordinator node. Alternatively, the component may call out to an administrator node in the selected data center to ascertain the identity of the coordinator node. In any case, the component returns the identity of the coordinator node ("x") to storage application 403.

Next, storage application 403 generates and submits a request at a local-quorum consistency level to the identified coordinator node ("x"), doing so by calling into database interface. The request is sent to a coordinator node at the site that manages interactions with other nodes at the site that have copies of the object. Here, the data center site is represented by data center 409A. In some cases, the coordinator node may itself retain a copy of the object, although in other cases, the coordinator need not be one of the replica nodes associated with the target object.

The coordinator node, per the local-quorum consistency level mandated by the request, attempts to obtain responses from a quorum of the replica nodes that hold the target object. As mentioned, a local quorum requires a majority of the replica nodes at a given site to reply with valid responses. For example, a database having a replication factor of three would be replicated to three nodes. As such, responses from two of the three nodes would represent a local quorum. In another example, a database replicated to five nodes would require three of the nodes to respond for the local quorum constraint to be satisfied.

It is assumed for exemplary purposes here that the coordinator node has not responded within an allowed timeframe, or otherwise replies with an invalid response due to its inability to achieve a quorum. Thus, storage application 403 proceeds to pick a next site from amongst data centers 409. In addition, storage application 403 queries database interface 406 for an identity of the coordinator node in the selected data center. Database interface 406 returns the identity ("y"), allowing storage application 403 to send a request to the next data center, represented here by data center 409B.

The coordinator node at data center 409B receives the request and, per the local-quorum consistency level identified by the request, attempts to achieve a quorum of responses from the replica nodes associated with the object in the request. A quorum of replica nodes replies with valid responses, allowing the coordinator node to reply to storage application 403. The valid responses may indicate that the object was found, not found, or in some other valid manner. Storage application 403 may then itself respond to the client application, allowing the client application to proceed with its own internal logic.

It is assumed for exemplary purposes here that the coordinator node has not responded within an allowed timeframe, or otherwise replies with an invalid response due to its inability to achieve a quorum. Thus, storage application 403 proceeds to pick a next node at a next site from amongst data centers 409. Here, it is assumed for exemplary purposes that storage application 403 has selected node "y" at data center 409B, allowing storage application 403 to send a request to the coordinator node at data center 409B.

The coordinator node at data center 409B receives the request and, per the local-quorum consistency level identified by the request, attempts to achieve a quorum of responses from the replica nodes associated with the object in the request. A quorum of replica nodes replies with valid responses, allowing the coordinator node to reply to storage application 403. The valid responses may indicate that the object was found, not found, or in some other valid manner. Storage application 403 may then itself respond to the client application, allowing the client application to proceed with its own internal logic.

The following discussion relates broadly to aspects of the any-local-quorum consistency level proposed herein. To provide redundancy and decrease access times for data stored in databases, computing organizations commonly use distributed databases. Where a traditional database stores data and executes transactions on a single computer or virtual endpoint, a distributed database is distributed across multiple nodes in a single data center, distributed across multiple data centers, or both. The nodes for a distributed database may be physical computers (e.g., servers) or virtualized endpoints (e.g., virtual machines). Database transactions are managed by the configuration of the database's consistency requirement. A consistency requirement stipulates that for any given database transaction, such as a read or a write, data may only be modified in certain allowed ways.

Examples of consistency requirements available for a database, such as the NoSQL database Cassandra™, include local-quorum consistency, quorum consistency, each-quorum consistency, all consistency, and integer consistency. Local-quorum consistency requires acknowledgement from more than 50 percent of replica nodes within a specific data center for the transaction to be successful. Quorum consistency requires acknowledgement from more than 50 percent of replica nodes across all data centers for the transaction to be successful. All consistency requires acknowledgement from all replica nodes in all data centers for a transaction to be successful. Finally, integer consistency (i.e., one, two, or three consistency) requires acknowledgement from a specific number of replica nodes across data centers.

For example, a consistency requirement for transactions may require local-quorum consistency at a particular data center. The data center in this example uses a replication factor (RF) of three. A replication factor defines the number of replica nodes on which data is replicated within a data center. Here, the example data center's RF of three indicates that data stored in that center is replicated on three replica nodes. Upon receiving a read request for a specific record at the example data center, a coordination node identifies the three replica nodes associated with that record and determines whether the three nodes identify the presence of the record. If a majority of the nodes identify the presence of the record, the record is returned. Without a majority of nodes indicating the record is present, local-quorum consistency is not satisfied, and the record request returns a response indicating the record's absence.

However, as distributed databases have become increasingly complex with additional nodes and data centers, implementing desired consistency requirements has become increasingly challenging. These challenges are compounded when a database's software limits the types of consistency requirements available for use.

As previously mentioned, distributed databases, (e.g., NoSQL databases) are distributed across multiple nodes, multiple data centers, or both. A Cassandra™ database, for example, supports distribution across three different data centers, where each data center has nine replica nodes. Examples of consistency requirements supported by Cassandra™ database include local-quorum consistency, quorum consistency, each-quorum consistency, all consistency, and integer consistency.

As a further example, a client application is executed on a physical computer or virtual endpoint (e.g., virtual machine) and generates a read request for a record stored at a given data center. As with the previous example, this example database transaction is subject to a local-quorum consistency requirement and the data center in question is configured with a replication factor (RF) of three. Note that a data center may have more nodes than a given RF requires. For example, a data center having nine nodes but only having an RF of two will result in a record or data that is only replicated on two of the nodes and is absent from the remaining seven.

When a record request is generated, it is sent by the client application to a coordination node responsible for identifying the corresponding replica nodes for the record using hashing or some other mechanism for the key associated with the record. Once the replica nodes for the record are identified, they are queried to determine whether a majority acknowledge or confirm the presence of the corresponding record. If a majority is reached, the record is returned to the client to satisfy the request. However, if a majority is not reached, then the coordination node will respond to the request indicating the absence of the record (or not respond it at all). Similar operations are available for a write command at the data center, though write and read consistency requirements are not required to be identical. However, different databases often carry different limitations regarding which consistency requirements are available. These limits support availability and replica consistency when a database is distributed over multiple data centers. Problems may occur where a database is distributed over multiple data centers and those data centers have incongruent consistency requirements.

Here, a management service is proposed that permits the use of a new consistency requirement that is not currently supported by a given database. This is accomplished by converting a request for a record under the new unsupported consistency requirement to one or more additional queries under a consistency requirement the database supports. Specifically, a client application may generate a request for a record using an any-local-quorum consistency requirement in the database, wherein the any-local-quorum consistency requirement comprises a requirement that at least one data center of multiple data centers provides a quorum for the record. In response to the request, the management service translates the initial request and requirements into subcomponents that are supported by the database in question. By querying one or more data centers of the multiple data centers under a local-quorum consistency requirement (as described above), the management service has effectively evaluated the any-local-quorum consistency requirement. The evaluation of the request's subcomponents employs the same analysis as the initial request itself and the management is therefore able return a valid response with regard to a consistency requirement that is otherwise unsupported.

In some implementations, the querying of the one or more data centers includes selecting a first data center from the multiple data centers for the record and querying a coordination node at the first data center for the record. The first data center is selected pseudo-randomly from the set of data centers, selected from a predefined list, or selected in some other manner. For example, the first data center may be the local site, followed by pseudo-randomly chosen control nodes at remote sites. If the coordination node at the first data center indicates that the record is available (i.e., a quorum exists at the first data center), then the management service will respond to the request with the record provided by the first data center or with in absent record indication, both of which are valid responses, in which case no further data centers need be queried. However, if the coordination node at the first data center indicates an unmet quorum (i.e., no quorum could be reached), then the management service will determine whether another data center is available to query.

Another data center is available to query where either additional data centers are available for the database, or the maximum number of data centers queried has not been reached. For example, a database distributed to nine data centers that has a set maximum number of data centers to be queried at five will query the first five data centers before returning a result. In that example, the manager will not query the sixth, seventh, eight, and ninth data centers.

The management service will continue querying different data centers until a quorum is identified at a data center and the record is provided for the response, all data centers have been queried and no record could be identified, or the maximum quantity of data centers have been queried and no record could be identified. When no record is identified or the record is determined to be absent for the database, the management service will respond to the request with an indication that the record is absent.

FIG. 6 illustrates computing system 601, which is representative of any system or collection of systems in which the various applications, processes, services, and scenarios disclosed herein may be implemented. Examples of computing system 601 include, but are not limited to server computers, web servers, cloud computing platforms, and data center equipment, as well as any other type of physical or virtual server machine, container, and any variation or combination thereof. (In some examples, computing system 601 may also be representative of desktop and laptop computers, tablet computers, and the like.)

Computing system 601 may be implemented as a single apparatus, system, or device or may be implemented in a distributed manner as multiple apparatuses, systems, or devices. Computing system 601 includes, but is not limited to, processing system 602, storage system 603, software 605, communication interface system 607, and user interface system 609. Processing system 602 is operatively coupled with storage system 603, communication interface system 607, and user interface system 609.

Processing system 602 loads and executes software 605 from storage system 603. Software 605 includes and implements request process 606, which is representative of the processes discussed with respect to the preceding Figures, such as request process 200. When executed by processing system 602, software 605 directs processing system 602 to operate as described herein for at least the various processes, operational scenarios, and sequences discussed in the foregoing implementations. Computing system 601 may optionally include additional devices, features, or functionality not discussed for purposes of brevity.

Referring still to FIG. 6, processing system 602 may include a micro-processor and other circuitry that retrieves and executes software 605 from storage system 603. Processing system 602 may be implemented within a single processing device but may also be distributed across multiple processing devices or sub-systems that cooperate in executing program instructions. Examples of processing system 602 include general purpose central processing units, microcontroller units, graphical processing units, application specific processors, integrated circuits, application specific integrated circuits, and logic devices, as well as any other type of processing device, combinations, or variations thereof.

Storage system 603 may comprise any computer readable storage media readable by processing system 602 and capable of storing software 605. Storage system 603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. Storage system 603 may be implemented as a single storage device but may also be implemented across multiple storage devices or sub-systems co-located or distributed relative to each other. Storage system 603 may comprise additional elements, such as a controller, capable of communicating with processing system 602 or possibly other systems.

Software 605 (including request process 606) may be implemented in program instructions and among other functions may, when executed by processing system 602, direct processing system 602 to operate as described with respect to the various operational scenarios, sequences, and processes illustrated herein. For example, software 605 may include program instructions for implementing request processes and procedures as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 605 may include additional processes, programs, or components, such as operating system software, virtualization software, or other application software. Software 605 may also comprise firmware or some other form of machine-readable processing instructions executable by processing system 602.

In general, software 605, when loaded into processing system 602 and executed, transforms a suitable apparatus, system, or device (of which computing system 601 is representative) overall from a general-purpose computing system into a special-purpose computing system customized to support enhanced access control as described herein. Indeed, encoding software 605 on storage system 603 may transform the physical structure of storage system 603. The specific transformation of the physical structure may depend on various factors in different implementations of this description. Examples of such factors may include, but are not limited to, the technology used to implement the storage media of storage system 603 and whether the computer-storage media are characterized as primary or secondary storage, as well as other factors.

For example, if the computer readable storage media are implemented as semiconductor-based memory, software 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 607 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method of operating a coordinator node in a data center that manages read and write requests associated with a database distributed across multiple replicas in multiple data centers, the method comprising:
   by the coordinator node:
      receiving a coordinator request from a storage application, wherein
         the storage application received a client request to perform an operation with respect to an object at an any-local-quorum consistency level, wherein the coordinator request is one of multiple coordinator requests sent from the storage application to the multiple data centers,
         wherein each of the coordinator requests indicates a local-quorum consistency level, and wherein
         the any-local-quorum consistency level causes the storage application to send the multiple coordinator requests iteratively to each of the multiple data centers until any one of the multiple data centers successfully replies to a corresponding one of the multiple coordinator requests; and
      responding to the coordinator request at a local-quorum consistency level, including by:
         replying to the coordinator request with the valid response if a quorum of replica nodes in the data center provide valid responses to queries made by the coordinator node to the replica nodes with respect to the operation; and
         replying to the coordinator request with an invalid response if the quorum of replica nodes cannot be achieved.

2. The method of claim 1 wherein the data center in which the coordinator node and the replica nodes reside comprises a same one of the multiple data centers across which the database is distributed.

3. The method of claim 1 wherein the storage application is hosted in a same one of the multiple data centers as the coordinator node and the replica nodes.

4. The method of claim 1 wherein the storage application is hosted in a different one of the multiple data centers as the coordinator node and the replica nodes.

5. The method of claim 1 wherein the coordinator request received by the coordinator node comprises a second one of the multiple coordinator requests sent by the storage application.

6. The method of claim 5 wherein the storage application sends a next one of the multiple coordinator requests iteratively in response to receiving an invalid response to a previous one of the multiple coordinator requests.

7. The method of claim 1 wherein the operation comprises one of a read operation, a write operation, or a delete operation.

8. A computing apparatus comprising:
   one or more computer readable storage media;
   one or more processors operatively coupled to the one or more computer readable storage media; and
   program instructions stored on the one or more computer readable storage media for operating a coordinator node in a data center that manages read and write requests associated with a database distributed across multiple replicas in multiple data centers;

wherein the program instructions, when read and executed by the one or more processors, direct the computing apparatus to at least:

receive a coordinator request from a storage application, wherein the storage application received a client request to perform an operation with respect to an object at an any-local-quorum consistency level, wherein the coordinator request is one of multiple coordinator requests sent from the storage application to the multiple data centers, wherein each of the coordinator requests indicates a local-quorum consistency level, and wherein the any-local-quorum consistency level causes the storage application to send the multiple coordinator requests iteratively to each of the multiple data centers until any one of the multiple data centers successfully replies to a corresponding one of the multiple coordinator requests; and respond to the coordinator request at a local-quorum consistency level.

9. The computing apparatus of claim 8 wherein, to respond to the coordinator request at the local-quorum consistency level, the program instructions direct the computing apparatus to:

reply to the coordinator request with a valid response if a quorum of replica nodes in the data center provide valid responses to queries made by the coordinator node to the replica nodes with respect to the operation; and reply to the coordinator request with an invalid response if the quorum of replica nodes cannot be achieved.

10. The computing apparatus of claim 9 wherein the data center in which the coordinator node and the replica nodes reside comprises one of the multiple data centers across which the database is distributed.

11. The computing apparatus of claim 9 wherein the storage application is hosted in a same one of the multiple data centers as the coordinator node and the replica nodes.

12. The computing apparatus of claim 9 wherein the storage application is hosted in a different one of the multiple data centers as the coordinator node and the replica nodes.

13. The computing apparatus of claim 9 wherein the coordinator request received by the coordinator node comprises a second one of the multiple coordinator requests sent by the storage application.

14. The computing apparatus of claim 13 wherein the storage application sends a next one of the multiple coordinator requests iteratively in response to receiving an invalid response to a previous one of the multiple coordinator requests.

15. The computing apparatus of claim 9 wherein the operation comprises one of a read operation, a write operation, or a delete operation.

16. One or more computer readable storage media having program instructions stored thereon for operating a coordinator node in a data center that manages read and write requests associated with a database distributed across multiple replicas in multiple data centers, wherein the program instructions, when read and executed by one or more processors of a computing apparatus, direct the computing apparatus to at least:

receive a coordinator request from a storage application, wherein the storage application received a client request to perform an operation with respect to an object at an any-local-quorum consistency level, wherein the coordinator request is one of multiple coordinator requests sent from the storage application to the multiple data centers, wherein each of the coordinator requests indicates a local-quorum consistency level, and wherein the any-local-quorum consistency level causes the storage application to send the multiple coordinator requests iteratively to each of the multiple data centers until any one of the multiple data centers successfully replies to a corresponding one of the multiple coordinator requests; and respond to the coordinator request at a local-quorum consistency level.

17. The one or more computer readable storage media of claim 16 wherein, to respond to the coordinator request at the local-quorum consistency level, the program instructions direct the computing apparatus to:

reply to the coordinator request with a valid response if a quorum of replica nodes in the data center provide valid responses to queries made by the coordinator node to the replica nodes with respect to the operation; and reply to the coordinator request with an invalid response if the quorum of replica nodes cannot be achieved.

18. The one or more computer readable storage media of claim 17 wherein the data center in which the coordinator node and the replica nodes reside comprises one of the multiple data centers across which the database is distributed and wherein the storage application is hosted in a same one or a different one of the multiple data centers as the coordinator node and the replica nodes.

19. The one or more computer readable storage media of claim 17 wherein the coordinator request received by the coordinator node comprises a second one of the multiple coordinator requests sent by the storage application.

20. The one or more computer readable storage media of claim 19 wherein the storage application sends a next one of the multiple coordinator requests iteratively in response to receiving an invalid response to a previous one of the multiple coordinator requests.

* * * * *